(12) United States Patent
Bovi

(10) Patent No.: US 6,382,325 B1
(45) Date of Patent: May 7, 2002

(54) PORTABLE MOTORIZED HOE

(75) Inventor: Fabio Bovi, Luzzara (IT)

(73) Assignee: Eurosystems S.p.A., Reggio Emilia (IT)

( * ) Notice: Subject to any disclaimer, the term of this patent is extended or adjusted under 35 U.S.C. 154(b) by 0 days.

(21) Appl. No.: 09/621,671

(22) Filed: Jul. 24, 2000

(30) Foreign Application Priority Data

Aug. 27, 1999 (IT) ........................................ RE990040 U

(51) Int. Cl.⁷ ............................................... A01B 33/00
(52) U.S. Cl. .......................... 172/41; 30/276; 30/277.4; 172/49
(58) Field of Search ............................. 172/15, 41, 42, 172/48, 49, 107, 103; D8/8; 30/276, 277.4, 296.1, DIG. 1

(56) References Cited

U.S. PATENT DOCUMENTS

| | | | | |
|---|---|---|---|---|
| 4,049,059 A | * | 9/1977 | Weibling | |
| 4,133,389 A | * | 1/1979 | Ruhl et al. | |
| 4,286,675 A | * | 9/1981 | Tuggle | |
| 4,293,041 A | * | 10/1981 | Holmstadt et al. | |
| 4,421,176 A | * | 12/1983 | Tuggle et al. | |
| 5,269,082 A | * | 12/1993 | Sund et al. | |
| D361,701 S | * | 8/1995 | Pink | |
| 5,544,417 A | * | 8/1996 | Atos et al. | |
| 5,615,970 A | * | 4/1997 | Reekie et al. | |
| D379,748 S | * | 6/1997 | Reekie et al. | |
| 5,634,322 A | * | 6/1997 | Woods et al. | |
| 6,000,836 A | * | 12/1999 | Nemazi et al. | |
| 6,181,032 B1 | * | 1/2001 | Marshall et al. | |
| 6,189,627 B1 | * | 2/2001 | Marshall et al. | |

* cited by examiner

Primary Examiner—Victor Batson
(74) Attorney, Agent, or Firm—Birch, Stewart, Kolasch & Birch, LLP

(57) ABSTRACT

Portable motorized hoe comprises a narrow elongate casing (1) forming the machine frame and comprising two complementary half-casings (2, 3) connected together in a direction parallel to the axis (99) of rotation of a hoeing unit, to provide, with reference to the working position assumed by the operator, in the part closest thereto a machine transporting and manoeuvring handle, in the intermediate part a housing containing an electric motor (80), and in the part farthest therefrom the support seats for said hoeing unit, the shaft of which is linkage-connected to said electric motor.

13 Claims, 2 Drawing Sheets

PORTABLE MOTORIZED HOE

FIELD OF THE INVENTION

This invention relates to a portable motorized hoe, used typically in a domestic environment for cultivating gardens, flowerbeds, vegetable gardens and the like.

SUMMARY OF THE INVENTION

An object of the invention is to provide a compact and lightweight motorized hoe which is easily maneuvered and transported.

A further object is to provide a portable motorized hoe in which all the moving parts, excluding the active region of the hoeing wheels, are protected or masked, and in which the outer machine structure does not comprise projecting elements or undersurface elements which could catch on objects, such as branches or the like.

These and other objects are attained by the present invention, which affords a device that is simple, rational and reliable in construction, inexpensive and safe to use.

Specifically, the motorized hoe of the invention comprises a narrow, elongated casing forming both the frame for the machine and the member by which it is maneuvered and transported.

The casing comprises two complementary half-casings connected together in a direction parallel to the axis of rotation of a hoeing unit With reference to the working position assumed by the operator, in the part closest thereto, a machine transporting and maneuvering handle is provided. In the intermediate part, a housing containing an electric motor is provided, and in the part farthest therefrom, support seats for the hoeing unit are provided, whereby the shaft is linkage-connected to the electric motor.

Preferably, the two half-casings each consist of two portions having substantially the same length and removably connected together.

In the intermediate part of the casing, there is also preferably provided a housing accessible from the outside for containing a storage battery for powering the electric motor.

The linkage connection between the electric motor and the hoeing unit is in the form of a step-down gear train.

Finally, the support seats for the hoeing unit are located in proximity to the plane in which the two half-casings are connected together, and rotatably carry the shaft of the downstream gearwheel of the gear train.

The opposite ends of the shaft extend beyond two flanges and each carries at least two hoeing rotors which are upperly enclosed by a terminal arched transverse wall of the respective half-casing to form a barrier which provides protection against stones and the like.

The construction and merits of the invention will be more apparent from the ensuing detailed description given with reference to the accompanying drawings.

DESCRIPTION OF THE PREFERRED EMBODIMENT

Figure 1:
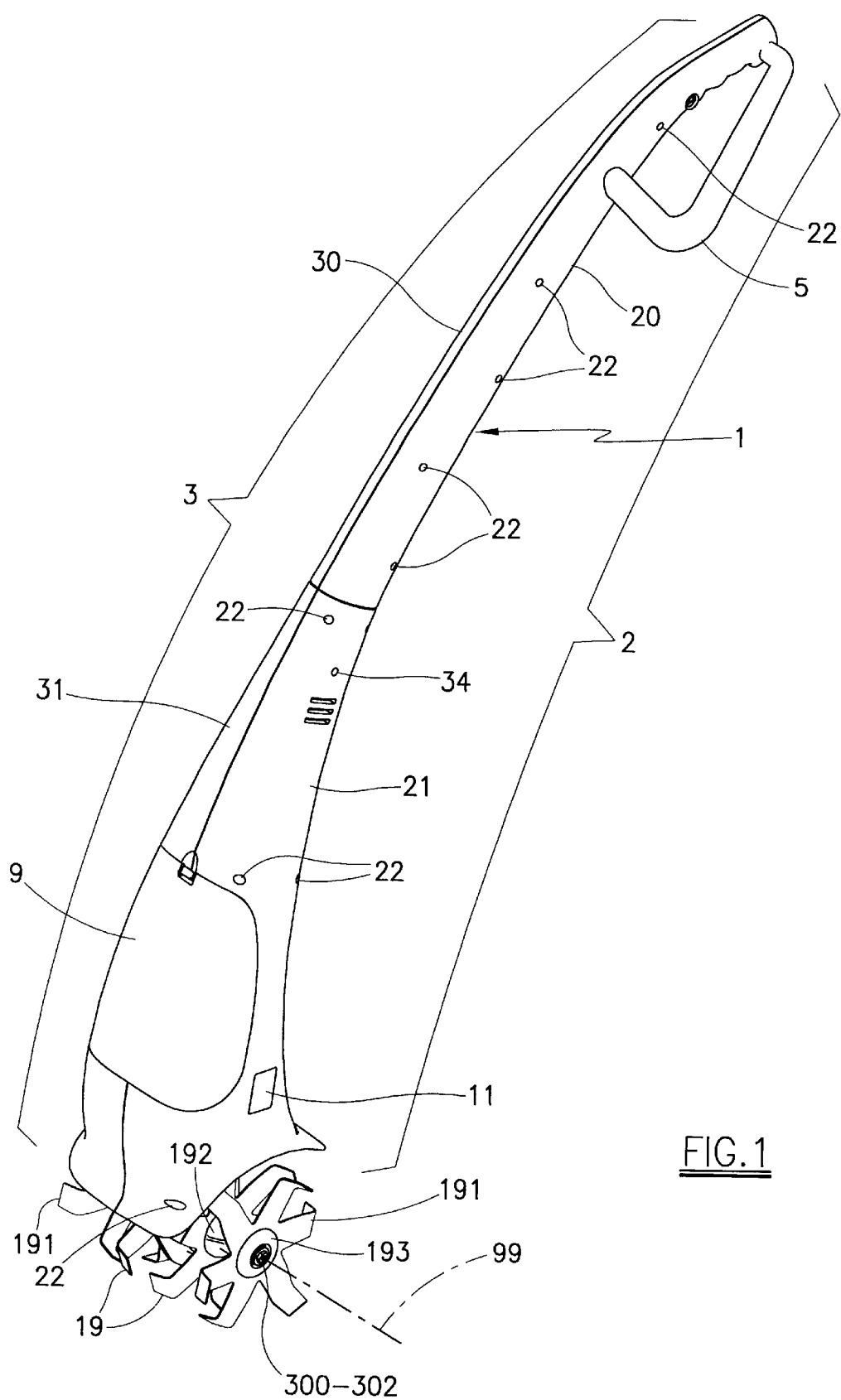
FIG. 1 is a perspective view of the assembled invention.

From the figures it can be seen that the motorized hoe comprises a narrow, elongated casing indicated overall by the reference numeral 1 and, as will be apparent hereinafter, forms both the frame of the machine and the member by which it is maneuvered and transported.

The casing 1 is of upwardly narrowing, tapered form which, in side view, is arched, with its concavity facing the side on which the operator is located during the use of the machine, i.e., upwards towards the right with reference to FIG. 1.

The casing 1 consists of two complementary half-casings, the right of which is indicated by 2 and the left by 3. The half-casings are connected together in the direction defined by the axis of rotation 99 (see FIG. 1) of the hoeing unit described hereinafter.

Figure 2:
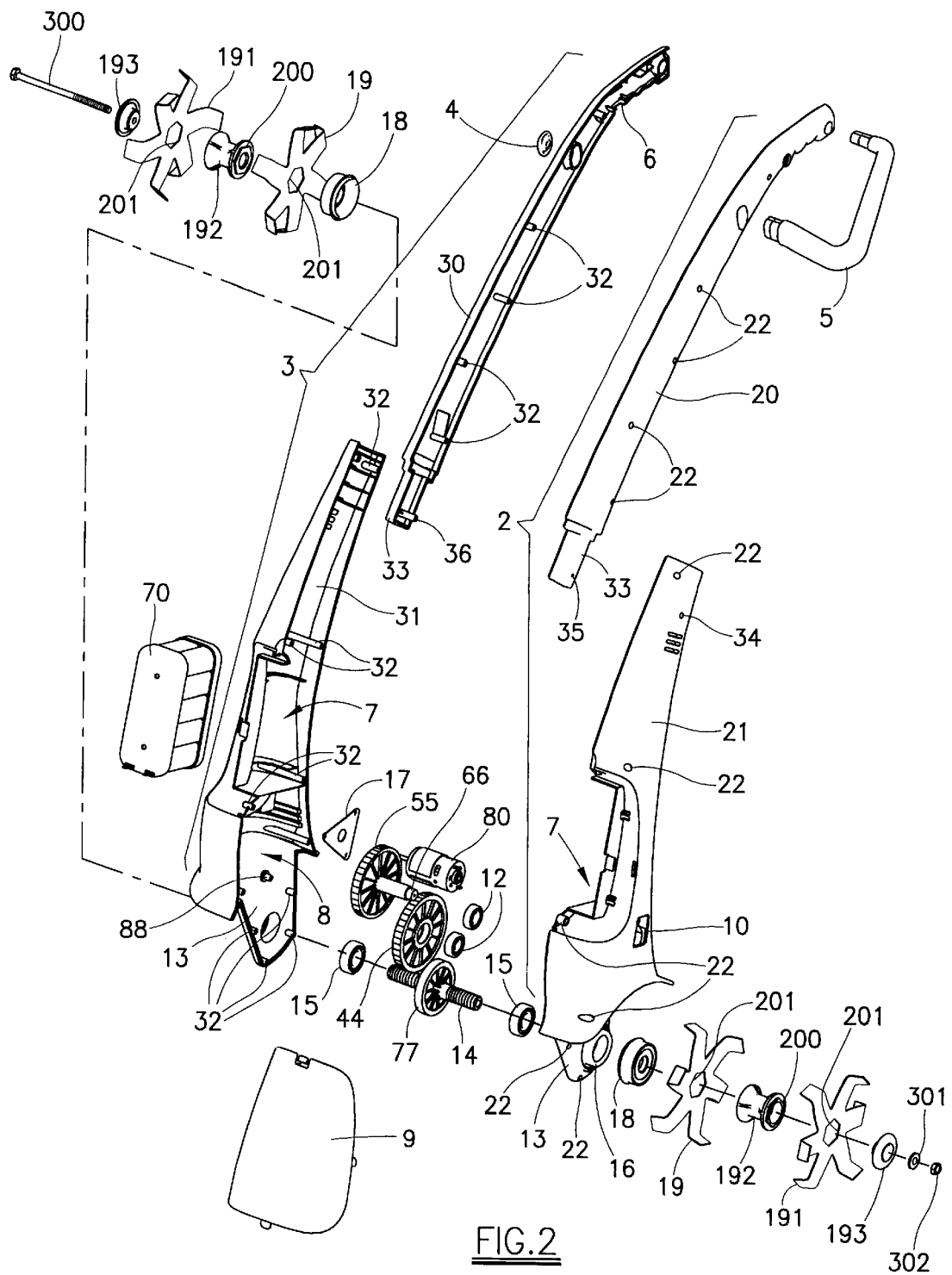
FIG. 2 is an exploded perspective view thereof on a smaller scale.

With reference to FIG. 2, each half-casing comprises two portions 20, 21 and 30, 31, respectively, of which portions 20, 30 are situated in proximity to the operator and form the handle for transporting and maneuvering the machine, while portions 21, 31 are more distant from the operator and form a hollow container for masking and containing the moving members of the machine, with the exception of the lower active region of the hoeing unit. The two half-casings 2, 3 are connected together by a series of self-tapping screws (not shown) to be inserted through respective holes 22 provided in the half-casing 2 and screwed into corresponding hollow bosses 32 branching from the inner surface of the half-casing 3.

The lower end of the handle 20, 30 has a cylindrical constriction 33 which mates with an inner matching seat provided at the top of the hollow container 21, 31, the handle 20, 30 and the hollow container 21, 31 being made rigid by at least one of the screws which passes through aligned holes 34, 35 provided in the portion 21 and in the right side of the constriction 33, respectively, and is screwed into a hollow inner boss 36 branching from the left side of said constriction 33.

A U-shaped handgrip 5 is removably fixed by two threaded plugs 4 (of which only one is visible in FIG. 2) to one side of the top of the handle 20, 30, the handle top also having a seat 6 for mounting a switch (not shown).

As can be seen in FIG. 2, the lower part of the hollow container 21, 31 comprises an upper housing 7 for containing a storage battery 70, and a lower compartment 8 for containing an electric motor 80 and a step-down gear unit.

The housing 7 is accessible from the outside via a removable front cover 9, said compartment 8 being closed for connecting together the two half-casings 2 and 3.

It should be noted that the motor 80 is electrically connected to a 12V storage battery 70 via said switch, and the wires for the connection are housed inside the machine casing.

Instead of incorporating a storage battery 70, the motor 80 can be connected to a usual 220V current socket via an electric cable extending from the upper end of the handle 20, 30 and a current rectifier.

Alternatively, an equivalent alternating current motor can be used. The casing of the motor 80 is fixed by screws to the top of the right side of the compartment 8 via a window indicated by 10 in FIG. 2 and provided with a snap-closure cover 11 (see FIG. 1). On the opposite side of the compartment 8, there is a holed plate 17 acting as a support for the exit shaft of the motor 80, and a pinion being keyed on said exit shaft (not visible in the figure). The pinion engages the greater-diameter gear 55 of a double ring gear, the lesser-diameter gear 66 of which engages an intermediate gear 44 which, in turn, engages a motion exit or terminal gear 77.

As can be seen from FIG. 2, the double ring gear 55, 66 and the intermediate gear 44 are contained in the compartment 8, the sides of which are provided with suitable means (such as that indicated by 88) for supporting the gears and their bearings (such as those indicated by 12), whereas the terminal gear 77 lies between two holed flanges 13 positioned in proximity to the connection surfaces of the half-casings 2 and 3.

The terminal gear 77 is keyed onto a hollow shaft 14, the two opposing portions of which form axle shafts of the hoeing unit.

Specifically, each axle shaft comprises a smooth portion close to the gear 77, followed by a threaded portion, the former acting as the seat for the inner race of a respective ball bearing 15, and the latter passing beyond a bushing 16 on the flange 13 which acts as the seat for the outer ring of the bearing 15.

On the projecting portion of each axle shaft, there are provided, starting from the respective bushing 16: a ring 18 screwed onto the axle shaft and having an undercut to receive the face bushing portion in order to protect the bearing 15; a first hoeing rotor 19 comprising six radial arms bent alternately in one direction and the other; a spacer 192 provided at its opposing ends with two hexagonal projections to engage in respective hexagonal holes 201 provided in the center of said hoeing rotor 19 and in the center of an opposing hoeing rotor 191; and an end ring 193.

The entire assembly is clamped together by a single threaded through rod 300 which, at one end, has a head received in a recess in one of said rings 193 and, at the other end, is provided with a washer 301 and a locking nut 302 received in a recess in the opposite ring 193. Finally, it should be noted that the upper part of the cylindrical surface swept by the hoeing rotors 19 and 191 is overlaid by an arched wall which forms the base of the compartment 8 and extends beyond the transverse outline of the casing to form a protection barrier against stones.

By way of example, the following are significant data of the aforedescribed portable motorized hoe B:

| | |
|---|---|
| speed of motor 80: | 16800 r.p.m. (if 12 V) |
| | 23500 r.p.m. (if 220 V) |
| power of motor 80: | 172 W (if 12 V) |
| | 156 W (if 220 V) |
| capacity of storage battery 70: | 7 Ah |
| rotational speed of hoeing rotors 19, 191: | 200 r.p.m. (if 12 V) |
| | 220 r.p.m. (if 220 V) |
| diameter of hoeing rotors: | 160 mm |
| width of worked strip: | 160 mm. |

The merits and advantages of the invention are apparent from the foregoing and from an examination of the accompanying figures.

What is claimed is:

1. A portable motorized hoe comprising:
    a hoeing unit including:
        an electric motor;
        a hoe shaft;
        a step-down gear unit;
    a narrow elongated casing for forming a maneuvering handle and a frame thereof, said narrow elongated casing having two complementary half-casing connected together in a direction parallel to an axis of rotation of the hoeing unit; and
    support seats for supporting said hoeing unit wherein said support seats are provided within a lower portion of said narrow elongated casing.

2. The portable motorized hoe as defined in claim 1, wherein said support seats further comprises two flanges that rotatably carry a shaft of a downstream gear wheel of said step-down gear unit.

3. The portable motorized hoe as defined in claim 2, wherein said shaft of the gear wheel extends beyond said flanges for carrying at least two hoeing rotors.

4. The portable motorized hoe as defined in claim 3, wherein said at least two hoeing rotors comprises six radial arms bent alternately in one direction and the other.

5. The portable motorized hoe as defined in claim 1, wherein said two complementary half-casing further comprises two portions removably connected together.

6. The portable motorized hoe as defined in claim 1, wherein said narrow elongated casing further comprises a housing accessible from the outside for containing a storage battery for powering said electric motor.

7. The portable motorized hoe as defined in claim 1, wherein said lower portion of said casing is of arched shape, which extends beyond a transverse outline of the casing to form a protection barrier against stones.

8. The portable motorized hoe as defined in claim 1, wherein said lower portion of said narrow elongated casing further comprises:
    an upper compartment for containing a storage battery; and
    a lower compartment for containing said electric motor and said step-sown gear unit.

9. The portable motorized hoe as defined in claim 8, wherein said lower compartment further comprises a holed plate for supporting an exit shaft of said electric motor.

10. The portable motorized hoe as defined in claim 9, wherein said exit shaft being keyed a pinion, said pinion engages a greater-diameter gear of a double ring gear, which in turn engages a lesser-diameter gear.

11. The portable motorized hoe as defined in claim 1, wherein a lower end of said maneuvering handle comprises a cylindrical constriction which mates with an inner matching seat.

12. The portable motorized hoe as defined in claim 1, wherein said two complementary half-casing being connected together by a series of self-taping screws, which is to be inserted through respective holes provided in said half-casing.

13. The portable motorized hoe as defined in claim 1, wherein said maneuvering handle comprises a U-shaped handgrip removably fixed by two threaded plugs.

* * * * *